United States Patent
Pawar (10) Patent No.: US 11,793,125 B2
(45) Date of Patent: Oct. 24, 2023

(54) TREE PROCESSING SYSTEM

(71) Applicant: DEERE & COMPANY, Moline, IL (US)

(72) Inventor: Sanket Pawar, Pune (IN)

(73) Assignee: DEERE & COMPANY, Moline, IL (US)

( * ) Notice: Subject to any disclaimer, the term of this patent is extended or adjusted under 35 U.S.C. 154(b) by 20 days.

(21) Appl. No.: 17/663,967

(22) Filed: May 18, 2022

(65) Prior Publication Data

US 2022/0272911 A1 Sep. 1, 2022

Related U.S. Application Data (62) Division of application No. 16/786,062, filed on Feb. 10, 2020, now abandoned.

(51) Int. Cl.
*A01G 23/081* (2006.01)

(52) U.S. Cl.
CPC .................................. *A01G 23/081* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | |
|---|---|---|---|
| 5,267,594 A | 12/1993 | Wiemeri et al. | |
| 6,374,877 B1 | 4/2002 | Wildey | |
| 6,986,368 B2 | 1/2006 | Brown | |
| 7,017,460 B2 | 3/2006 | Virvalo et al. | |
| 9,545,062 B2 | 1/2017 | Raszga et al. | |
| 10,098,290 B2 | 10/2018 | Hunt | |
| 11,457,573 B2 * | 10/2022 | Eliasson | A01G 23/091 |
| 2017/0066155 A1 | 3/2017 | Ketonen | |
| 2019/0297793 A1 | 10/2019 | Eliasson | |

FOREIGN PATENT DOCUMENTS

| | | |
|---|---|---|
| CN | 110562343 A | 12/2019 |
| WO | WO1999012410 A1 | 3/1999 |
| WO | WO2011078673 A1 | 6/2011 |
| WO | WO 2015084186 A2 | 6/2015 |
| WO | WO 2018056842 A1 | 3/2018 |

* cited by examiner

*Primary Examiner* — Matthew Katcoff (57) ABSTRACT

A method for a tree processing head to harvest a tree includes initiating a cutting operation on a tree, the cutting operation including powering a cutting chain of a saw bar driven by a motor; securing the tree; moving the saw bar via an actuator, the saw bar configured to be moved from a home position to a first position and to a second position, and the first position and the second position defining a cutting zone; detecting a hydraulic pressure of at least one of the motor and the actuator by a sensor; determining whether the second position is reached based upon a decrease of the hydraulic pressure by a controller; and transmitting a resting signal to the tree processing head to perform a resting operation when the controller determines that the second position is reached.

14 Claims, 10 Drawing Sheets

TREE PROCESSING SYSTEM

RELATED APPLICATIONS

This application is a divisional of prior application Ser. No. 16/786,062, filed Feb. 10, 2020, which is herein incorporated by reference in its entirety

FIELD OF THE DISCLOSURE

The present disclosure relates generally to tree processing system. In particular, the tree processing system includes a tree processing head used for cutting and grabbling trees.

BACKGROUND OF THE DISCLOSURE

Tree processing head may be various kind of heads, including a felling head which separates the standing stem and a grapple saw head which separates the felled tree. The felling head further includes two types; one type is disk saw felling head and the other type is the bar saw felling head. The former utilizes a disk saw rotating about an axis fixed within the disk saw felling head. The latter utilizes a bar saw to cut the tree.

As to the bar saw felling head and grapple saw head, since the heads obstruct the vision of the tree cutting area, the saw bar of the bar saw felling head or grapple saw head needs to be commanded for more time than desired for the tree separation. During this entire course of travel, the saw bar position is unknown to the operator due to blind spot. In order to ensure that the stem is cut completely, the operator needs to wait until the saw bar is visible on the opposite side of the tree.

SUMMARY OF THE DISCLOSURE

According to an aspect of the present disclosure, a tree processing system may comprise a tree processing head and a controller. The tree processing head may include a header frame, a motor, a saw bar, an arm, an actuator and a sensor. The motor is coupled to the header frame. The saw bar is coupled to the motor. The saw bar is configured for cutting a tree when the saw bar is driven by the motor. The arm is pivotally coupled to the header frame and configured to secure the tree. The actuator is coupled to the saw bar and is configured to move the saw bar from a home position to a first position and to a second position. The first position and the second position define a cutting zone therebetween. The sensor is configured to detect a hydraulic pressure of at least one of the motor and the actuator. The controller is coupled to the sensor and is configured to determine whether the second position is reached based upon a decrease of the hydraulic pressure detected by the sensor. When the second position is reached, the controller transmits a resting signal to the tree processing head to perform a resting operation.

According to an aspect of the present disclosure, a tree processing system may include a tree processing head and a controller. The tree processing head may include a header frame, a motor, a saw bar, an arm, an actuator, an arm position sensor, and a saw bar position sensor. The motor is coupled to the header frame. The saw bar is coupled to the motor. The saw bar is configured for cutting a tree when the saw bar is driven by the motor. The arm apparatus is pivotally coupled to the header frame and is configured to secure the tree when the arm apparatus pivots to engage the tree. The actuator is coupled to the saw bar and is configured to move the saw bar from a home position to a first position and to a second position. The first position and the second position define a cutting zone therebetween. The arm position sensor is configured to detect a position of the arm apparatus and to transmit a first signal indicative of the position of the arm apparatus. The saw bar position sensor is configured to detect a position of the saw bar and to transmit a second signal indicative of the position of the saw bar. The controller is configured to receive the first signal and the second signal. The controller is configured to determine whether the second position is reached based upon the first signal and the second signal. When the second position is reached, the controller transmits a resting signal to the tree processing head to perform a resting operation.

According to an aspect of the present disclosure, a method for a tree processing head to harvest a tree, comprising: initiating a cutting operation on a tree, the cutting operation including powering a cutting chain of a saw bar driven by a motor; securing the tree by an arm apparatus pivotally coupled to a header frame of the tree processing head; detecting a position of the arm apparatus to transmit a first signal by an arm position sensor; moving the saw bar, which is configured to be moved from a home position to a first position and to a second position, the first position and the second position defining a cutting zone therebetween; detecting a position of the saw bar to transmit a second signal by a saw bar position sensor; determining whether the second position is reached based upon the first signal and the second signal; and transmitting a resting signal to the tree processing head to perform a resting operation.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
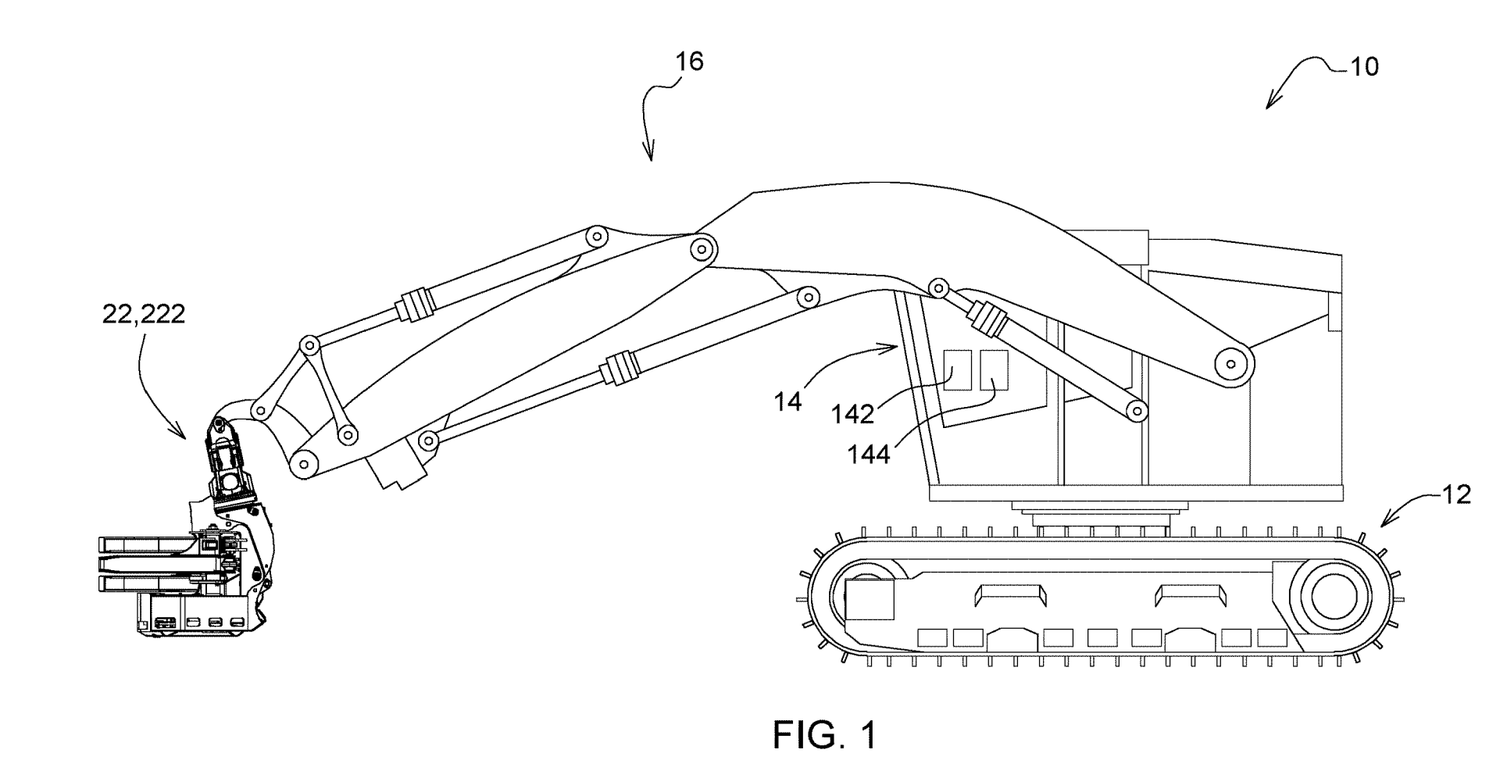
FIG. 1 is a side view of a work vehicle.

Referring to FIG. 1, a work vehicle 10 of one embodiment is depicted as a feller buncher. The work vehicle 10 include a chassis 12, a cab 14 coupled to the chassis 12, a knuckle boom assembly 16 pivotally coupled to the chassis 12, and a tree processing head 22 pivotally coupled to the knuckle boom assembly 16. The connection between the tree processing head 22 depends on the type of tree processing head 22. In one embodiment, the tree processing head 22 is a felling head 222, and the felling head 222 is coupled to the end of the knuckle boom assembly 16 via a horizontal pin about which the felling head 222 can tilt. In another embodiment, the tree processing head 22 is a grapple saw head 224 (shown in FIG. 4I), and the grapple saw head 224 is coupled to the end of the knuckle boom assembly via a vertical pin about which the grapple saw head can rotate. There is at least one operator control member 142 in the cab 14. The operator control member 142 provides an operator an interface to control the work vehicle 10 and/or the tree processing head. For example, the operator control member 142 may include one or more joysticks, various levers or switches, keyboard, touchscreen or other input devices. At least one indicator 144, such as monitor, light, alarm is positioned within the cab to instruct, suggest, inform, or warn the operator responsive to various conditions.

Figure 2:
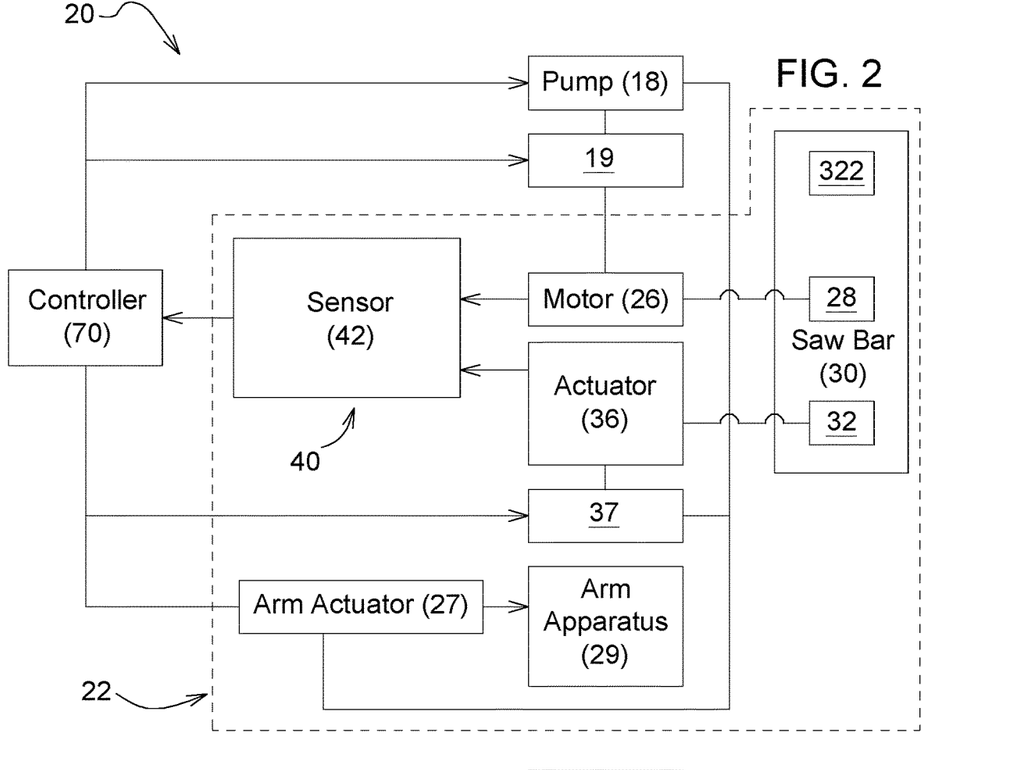
FIG. 2 is a block diagram of the first embodiment showing a tree processing system.
Figure 3:
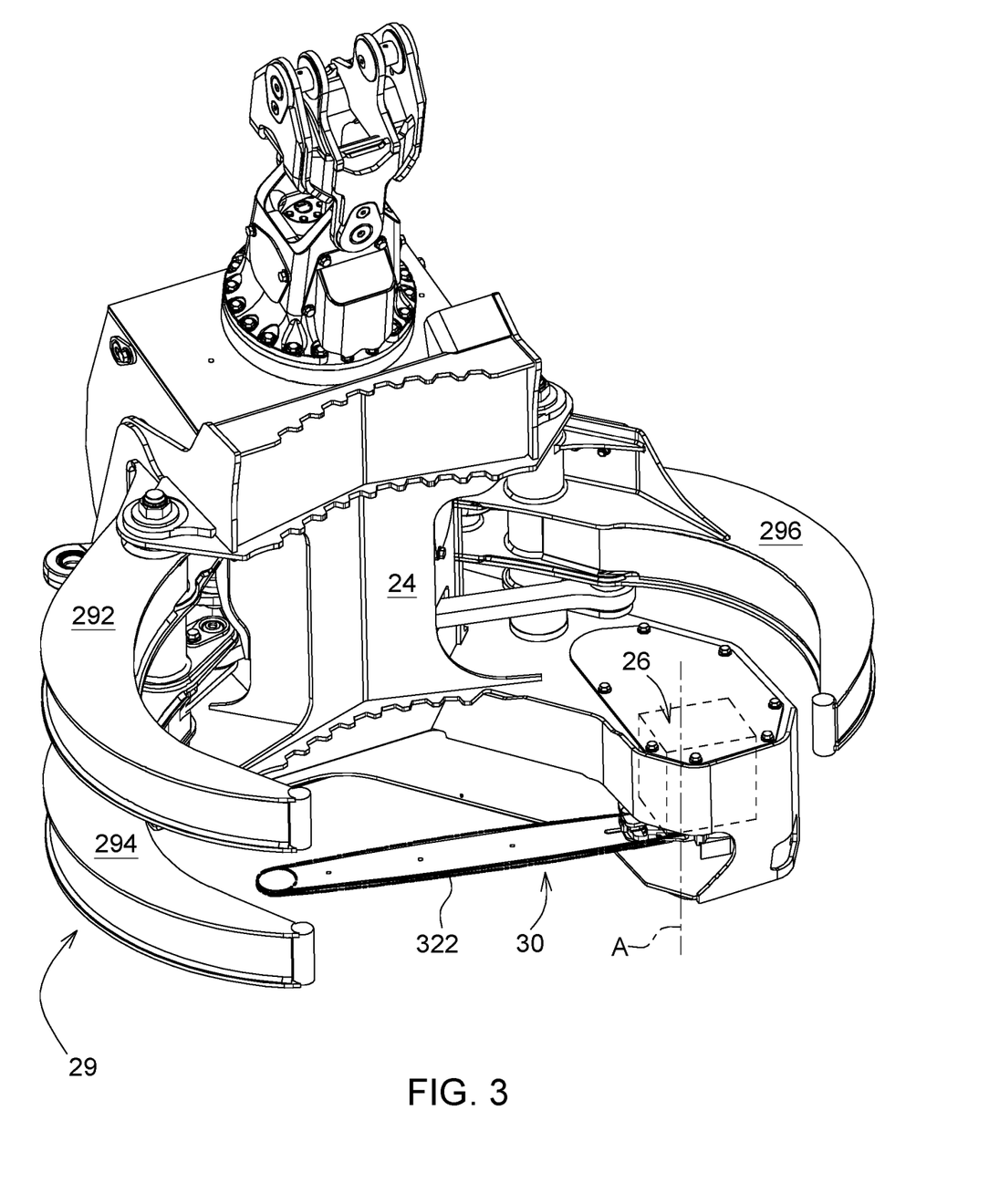
FIG. 3 is a perspective view of a felling head of a first embodiment.

Referring to FIG. 2, a block diagram illustrates a tree processing system 20 of the work vehicle 10 in the first embodiment, and FIG. 3. The tree processing system 20 includes a pump 18, a flow control valve 19 coupled to or comprised by the pump 18, and the tree processing head 22. The pump 18 is configured to pump a hydraulic fluid to a motor 26 of the tree processing head 22 to drive a cutting chain 322 coupled to the saw bar 30. The pump 18 is also configured to pump the hydraulic fluid to an actuator 36 of the tree processing head 22. The pump 18 may be a part of the tree processing head 22 or a part of the work vehicle 10. The flow control valve 19 in this embodiment is a proportional solenoid control valve, which is electrically coupled to the controller 70. Based on the signal from the controller 70, the flow control valve 19 is configured to adjust the flow of the hydraulic fluid so as to change the speed of the motor 26. In another embodiment, the controller 70 may directly control the speed of the motor 26 if the motor 26 is an electric motor. The tree processing head 22 also includes the actuator 36 or saw bar feed cylinder 36, which is configured to move the saw bar 30 to different positions. In this embodiment, a flow control valve 37 controls the flow and direction thereof toward the actuator 36. With the extension and retraction of the actuator 36, a guide bar 32 of the saw bar 30 is configured to swing and to cut the trees. Detail structural description of the tree processing head 22 will be introduced later. The tree processing head 22 further includes an arm apparatus 29 used to at least secure, grapple or relocate the tree that is harvested and is controlled by the controller 70. In this embodiment, the controller 70 is coupled to an arm actuator 27 (or to a flow control valve hydraulically coupled to the actuator 27) so as to pivot the arm apparatus 29. The tree processing head 22 also includes a sensor assembly 40 in the first embodiment, which is a hydraulic pressure sensor 42. The hydraulic pressure sensor 42 may include a transducer, converting a pressure measurement into an electric output signal. The hydraulic pressure sensor 42 is configured to detect and/or measure the hydraulic pressure of either the motor 26 or actuator 36 (saw bar feed cylinder 36), and to transmit the electric output signal indicative of the hydraulic pressure to the controller 70. The number of the hydraulic pressure sensor 42 in another embodiment can be multiple. For example, one hydraulic pressure sensor 42 is coupled to or included by the motor 26, and another hydraulic pressure sensor 42 is coupled to or included by the actuator 36, and therefore the controller 70 is able to receive the two electric output signals respectively indicative of the hydraulic pressure of the motor 26 and the actuator 36. The output signals can be electric signals, such as current signals or voltage signals. In other embodiments, the hydraulic pressure sensor 42 can transmit hydraulic signal indicative of hydraulic pressure to a controller which may be configured as an assembly of hydraulic components such as flowlines, valve, and actuator (not shown).

The controller 70 (or multiple controllers) may be provided, in general, to control various aspects of operation of the work vehicle 10. The controller 70 may be defined, in the first embodiment, as a computing device associated with microprocessors and memory. The controller 70 may communicate with various systems of the work vehicle 10 via a controller area network (CAN) bus or wireless connection, for example. The controller 70 is configured to receive commands from the operator control member 142 to perform various tasks, such as controlling various control valves and/or actuators to move the knuckle boom assembly 16, to rotate or tilt the tree process head 22, and operating the components of the tree processing head 22. The controller 70 is also configured to receive signal(s) from the sensor assembly 40, which includes one or more sensors such as the hydraulic pressure sensor(s) 42 in the first embodiment. The controller 70 is also configured to determine whether one or several conditions is met, based on the signal from the sensor assembly 40, and then the controller 70 may transmit one or more signals to control at least one of knuckle boom assembly 16 or the tree processing head so as to perform various operations. The details of the operations in the first embodiment will be described with FIGS. 2, 3, 4A-4C later.

Referring to FIGS. 2 and 3, the tree processing head 22 (for this embodiment, it is felling head 222) includes a header frame 24 and the motor 26 coupled to the header frame 24. In the first embodiment, the motor 26 is driven by the hydraulic fluid. The motor 26 has an output shaft (not shown), which is further coupled to a sprocket 28 coupled to or included by the saw bar 30. The sprocket 28 may be directly or indirectly coupled to the cutting chain 322 around the guide bar 32 of the saw bar 30. The arm apparatus 29 in this embodiment includes a first arm 292, a second arm 294, and a third arm 296 cooperating with one another to secure the tree in the cutting operation.

Figure 4A:
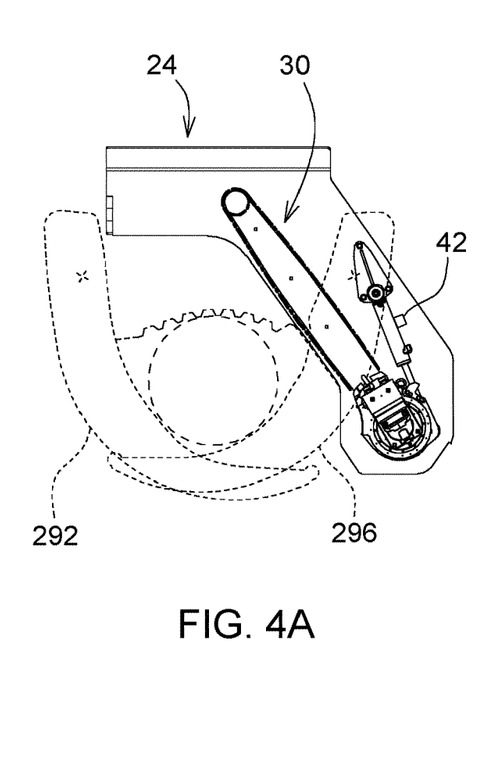
FIG. 4A illustrates the saw bar in the home position of the first embodiment.
Figure 4B:
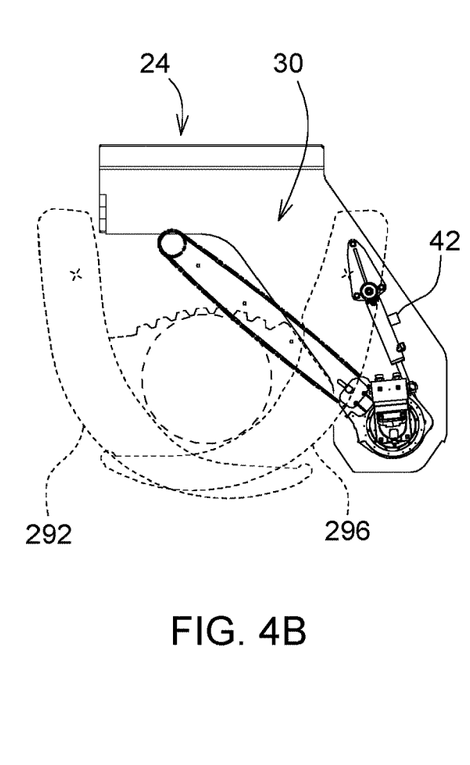
FIG. 4B illustrates the saw bar in the first position of the first embodiment.
Figure 4C:
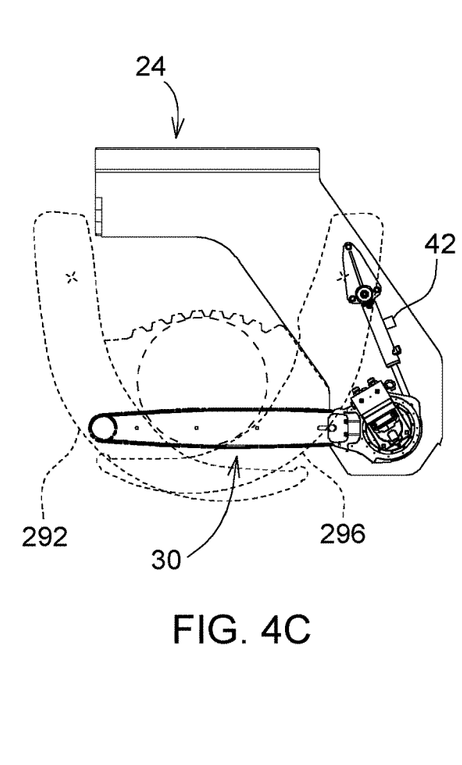
FIG. 4C illustrates the saw bar in the second position of the first embodiment.
Figure 4D:
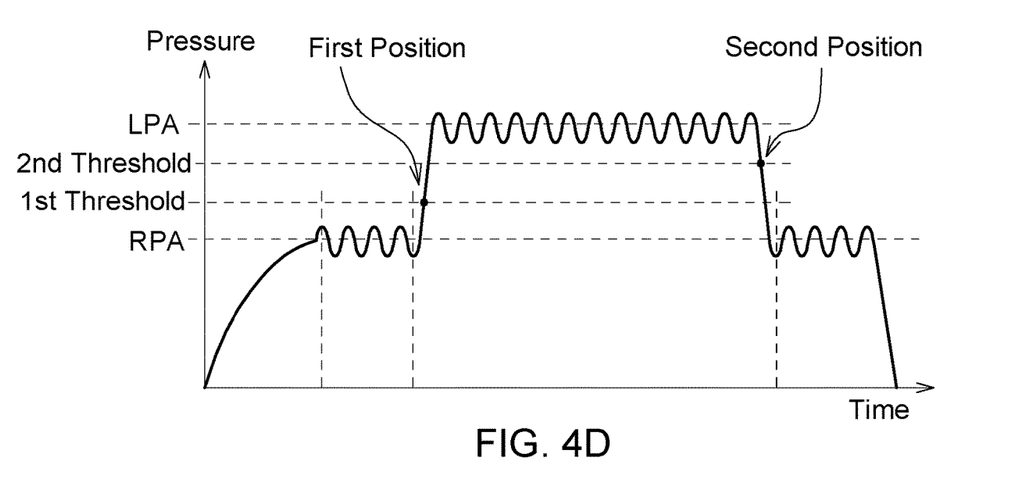
FIG. 4D illustrates the hydraulic pressure of the actuator in response to the time when the saw bar moves from the home position to the away position of the first embodiment.
Figure 4E:
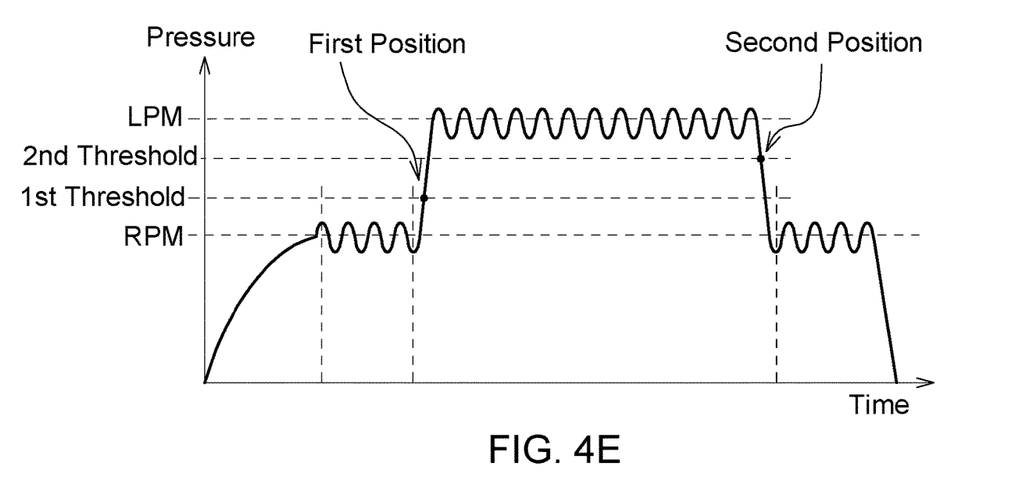
FIG. 4E illustrates the hydraulic pressure of the motor in response to the time when the saw bar moves from the home position to the away position of the first embodiment.

It is noted that in this embodiment, the saw bar 30 is configured to pivot around an axis A. As shown in FIG. 4A-4C, the actuator 36 is coupled to the saw bar 30 and configured to move the saw bar 30 from a home position (FIG. 4A) to a first position (FIG. 4B) and to a second position (FIG. 4C), a cutting zone defined by a zone between the first position and the second position. FIGS. 4D and 4E illustrate the hydraulic pressure of the actuator 36 and the motor 26 changing with the different positions of saw bar 30 during cutting operation.

In FIG. 4A, the arm apparatus 29 clamps the tree against part of the header frame 24 so as to secure the tree. The saw bar 30 is located in the home position where the hydraulic pressure of the actuator 36 (FIG. 4D) increases to a reference pressure RPA and the hydraulic pressure of the motor (FIG. 4E) increases to a reference pressure RPM, before the saw bar 30 cuts the tree.

In FIG. 4B, the saw bar 30 is moved to the first position. The resistance from the tree increases the hydraulic pressure of the actuator 36 from the reference pressure RPA to a loading pressure LPA, as shown in FIG. 4D. Similarly, the resistance from the tree increases the hydraulic pressure of the motor 26 from the reference pressure RPM to a loading pressure LPM, as shown in FIG. 4E. The controller 70 is configured to determine whether the first position is reached based upon an increase of the hydraulic pressure of the actuator 36 and/or the motor 26 detected by the hydraulic pressure sensor 42. When the controller 70 determines that the first position is reached, the controller 70 transmits a loading signal to the tree processing head 22 to increase the hydraulic power flowing into the motor 26. As to the criteria, for example, the controller 70 may determine the first position is reached when the hydraulic pressure of the actuator 36 exceeds a first pressure threshold of the actuator 36 pre-stored in a memory coupled to or included by the controller 70, and/or is reached when the hydraulic pressure of the motor 26 exceeds a first pressure threshold of the motor 26. The first pressure threshold of the actuator 36 and the first pressure threshold of the motor 26 may be assigned by the operator control member 142 such as keyboard, or other means. Alternatively, the controller 70 may determine the first position is reached when the hydraulic pressure of the actuator 36 exceeds the peak of the wave of the reference pressure RPA, the peak defined as a first pressure threshold of the actuator 36, and/or is reached when the hydraulic pressure of the motor 26 exceeds the peak of the wave of the reference pressure RPM, the peak defined as a first pressure threshold of the motor 26. Optionally, after the controller 70 determines that the first position is reached, it transmits a signal to the indicator 144 to notify the operator that the first position is reached.

In FIG. 4C, the saw bar 30 is moved to the second position. The removal of resistance from the tree decreases the hydraulic pressure of the actuator 36 from the loading pressure LPA to the reference pressure RPA, as shown in FIG. 4D. Similarly, the removal of resistance from the tree decreases the hydraulic pressure of the motor 26 from the loading pressure LPM to the reference pressure RPA, as shown in FIG. 4E. The controller 70 is configured to determine whether the second position is reached based upon a decrease of the hydraulic pressure of the actuator 36 and/or the motor 26 detected by the hydraulic pressure sensor 42. When the controller 70 determines that the second position is reached, the controller 70 transmits a resting signal to the tree processing head 22 to decrease the speed of the motor 26 (or to decrease the hydraulic power flowing into the motor 26) and/or return the saw bar 30 to its home position. The resting signal may be transmitted to one or more valves to decrease the hydraulic pressure on the motor 26, or transmitted to the pump 18 to decrease the pumping pressure, for example. The resting signal may be transmitted to the actuator 36 or a flow control valve 37 coupled to or included by the actuator 36 to retract, in this embodiment, so as to return the saw bar 30 to the home position. It is noted that the decrease of the hydraulic pressure that the controller 70 utilizes to determine the second position may be in various criteria. For example, the controller 70 may determine the second position is reached when the hydraulic pressure of the actuator 36 drops below a second pressure threshold of the actuator 36 pre-stored in a memory coupled to or included by the controller 70, and/or is reached when the hydraulic pressure of the motor 26 drops below a second pressure threshold of the motor 26. The second pressure threshold of the actuator 36 and the second pressure threshold of the motor 26 may be assigned by the operator control member 142 such as keyboard, or other means. Alternatively, the controller 70 may determine the second position is reached when the hydraulic pressure of the actuator 36 drops below the valley of the wave of the reference pressure RPA, the valley defined as a second pressure threshold of the actuator 36, and/or is reached when the hydraulic pressure of the motor 26 drops below the valley of the wave of the reference pressure RPM, the valley defined as a second pressure threshold of the motor 26. Optionally, after the controller 70 determines that the second position is reached, it transmits a signal to the indicator 144 to notify that the second position is reached.

Because the controller 70 is configured to determine the second position is reached and to transmit the resting signal to other component of the work vehicle 10, the operator does not have to continuously observe the guide bar 32 of the saw bar 30 cutting and passing through the tree and then to manually stop the cutting operation. Therefore, the cutting cycle is shortened and the dry run cycle in saw bar 30 (when saw bar 30 runs its full speed but cuts nothing) is avoided. It is noted that in both FIGS. 4D and 4E, the period after the second position is reached indicates an unnecessary cutting time or dry run time in an away position or away zone. With the operation of the present disclosure, such period can be minimized.

Figure 4F:
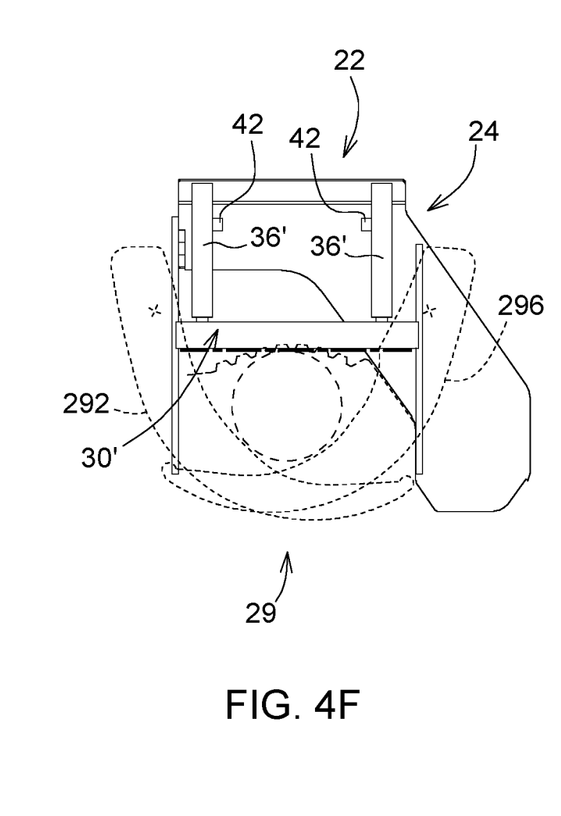
FIG. 4F illustrates another variation of the first embodiment that has two actuators configured to move the saw bar.
Figure 4G:
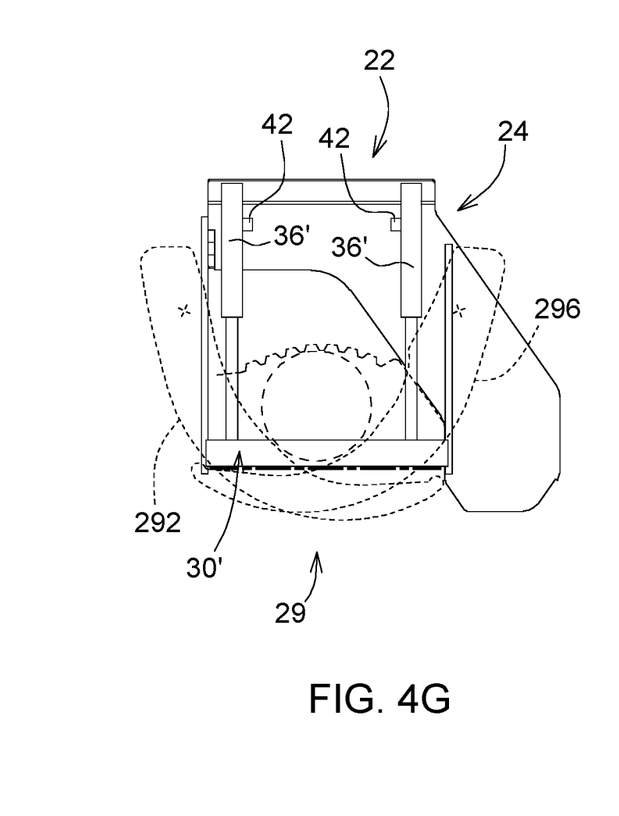
FIG. 4G illustrates the two actuators extending to move the saw bar of the embodiment of FIG. 4F.

FIGS. 4F and 4G illustrate another variation of the first embodiment. There are two actuators 36' coupled between the header frame 24 and to a saw bar 30'. FIG. 4F illustrates the two actuators 36' staying at their home position. FIG. 4G illustrates the two actuators 36' extend to move the saw bar 30' to reach the second position. The second position, similar to the first embodiment described previously, is determined by a controller (not shown) which receives hydraulic pressure signals. Here, two hydraulic sensors 42 may be respectively coupled to one of the two actuators 36' to measure the hydraulic pressure of the two actuators 36' and then each hydraulic sensor 42 transmits a signal indicative of the hydraulic pressure of the corresponding actuator 36' to the controller. The controller transmitting loading signal based on the first position and transmitting a resting signal based on the second position is similar to the configuration of the controller 70 in the first embodiment and the description thereof is omitted in this variation.

Figure 4H:
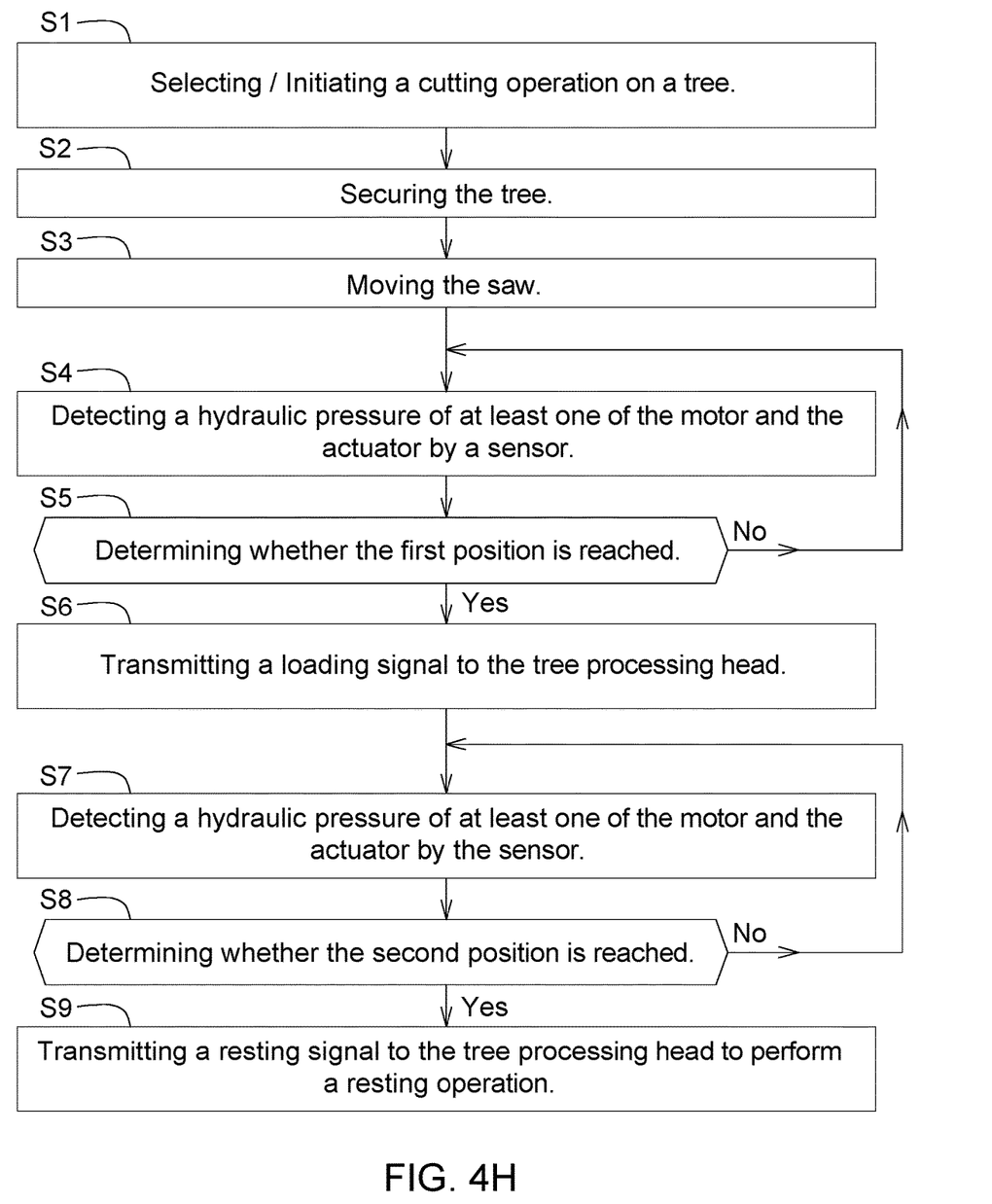
FIG. 4H is a flow chart illustrating a method for the tree processing head in the first embodiment to harvest a tree.
Figure 4I:
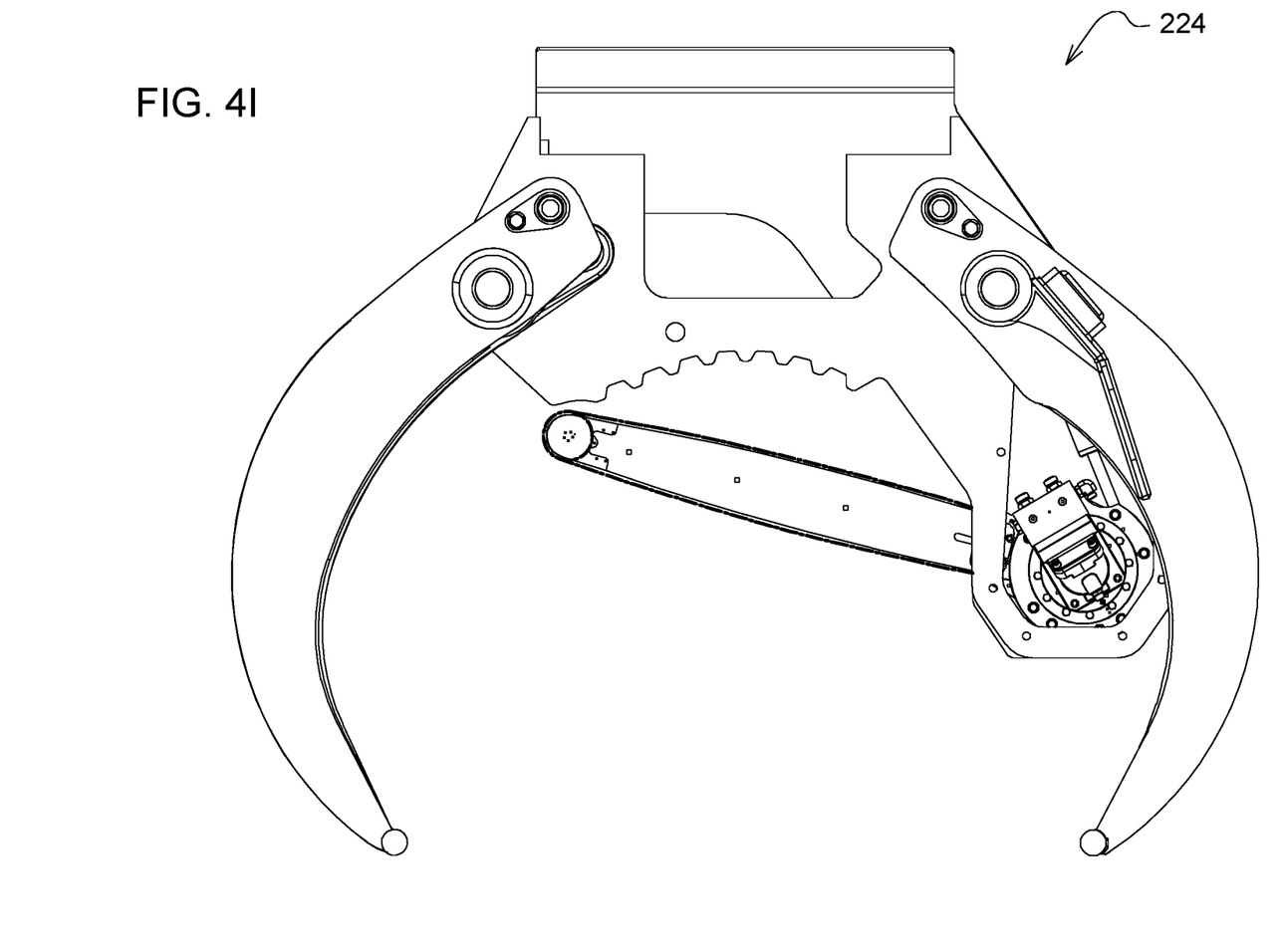
FIG. 4I illustrates a tree processing head in another embodiment, which is a grapple saw head.

FIG. 4H is a flow chart illustrating a method for a tree processing head to harvest a tree.

S1: initiating/selecting a cutting operation on a tree, the cutting operation including powering a cutting chain of a saw bar driven by a motor. The operator makes this selection through the operator control member.

S2: securing the tree by the arm apparatus. It is noted that S2 can be performed before or after S1.

S3: moving the saw bar by an actuator. The saw bar is configured to be moved from a home position to a first position and to a second position. A cutting zone is defined by a zone between the first position and the second position.

S4: detecting a hydraulic pressure of at least one of the motor and the actuator by a sensor.

S5: determining whether the first position is reached based upon an increase of the hydraulic pressure detected by the sensor. If yes, go to S6. If no, go to S4. It is noted that a controller determines the first position by comparing the hydraulic pressure with a first pressure threshold.

The data of the first pressure threshold may be retrieved from a memory coupled to or included by the controller. The data is pre-set by the user. Alternatively, the first threshold may be determined by a small increase, defined by percentage of the hydraulic pressure (before it increases) or by a peak of a wave of the hydraulic pressure, for example.

S6: transmitting a loading signal to the tree processing head to increase the hydraulic power flowing into the motor.

S7: detecting a hydraulic pressure of at least one of the motor and the actuator by a sensor.

S8: determining whether the second position is reached based upon a decrease of the hydraulic pressure by a controller. If yes, go to S9. If no, go to S7, in which the motor may maintain the same speed. It is noted that the controller determines the second position by comparing the hydraulic pressure with a second pressure threshold.

The data of the second pressure threshold may be retrieved from a memory coupled to or included by the controller. The data is pre-set by the user. Alternatively, the first threshold may be determined by a small decrease, defined by percentage of the hydraulic pressure (before it decreases) or by a valley of a wave of the hydraulic pressure, for example.

S9: transmitting a resting signal to the tree processing head to perform a resting operation. The resting operation includes returning the saw bar to the home position and/or slowing a speed of the motor (decreasing hydraulic power flowing into the motor).

Referring to FIGS. 5A-5D, the sensor assembly 40 in this embodiment includes position sensor(s) 44. The position sensors 44 in this embodiment include a first arm position sensor 442 coupled to the first arm 292, a third arm position sensor 446 coupled to the third arm 296, and a saw bar position sensor 448 coupled to the saw bar 30. The first arm position sensor 442 is configured to detect a position of the first arm 292 of arm apparatus 29 and to transmit a signal indicative of the position of the first arm 292 to the controller 70. The third arm position sensor 446 is configured to detect a position of the third arm 296 of arm apparatus 29 and to transmit a signal indicative of the position of the third arm 296 to the controller 70. The saw bar position sensor 448 is configured to detect a position of the saw bar 30 and to transmit a signal indicative of the position of the saw bar 30 to the controller 70. In this embodiment, the first arm position 442, the third arm position sensor 446, and the saw bar position sensor 448 are angle sensors respectively located adjacent to the pivot points of the first arm 292, the third arm 296 and the saw bar 30. Due to the geometric data saved in the memory coupled to the controller 70, the controller 70 may use the signals from the first arm position sensor 442, third arm position sensor 446, and saw bar position sensor 448 to calculate the positions of the first arm 292, the third arm 296 and the saw bar 30 and to determine whether the first position or the second position is reached, which will be described later. Alternatively, the first arm position 442, the third arm position sensor 446 are coupled to the arm actuator(s) 27 and the saw bar position sensor 448 is coupled to the actuator 36 so as to detect the movements (e.g., extension or retraction) of the arm actuator(s) 27 and the actuator 36. Similarly, due to the geometric data saved in the memory coupled to the controller 70, the controller 70 may use the signals from the first arm position sensor 442, third arm position sensor 446, and saw bar position sensor 448 to calculate the positions of the first arm 292, the third arm 296 and the saw bar 30 and to determine whether the first position or the second position is reached, which will be described later.

Figure 5A:
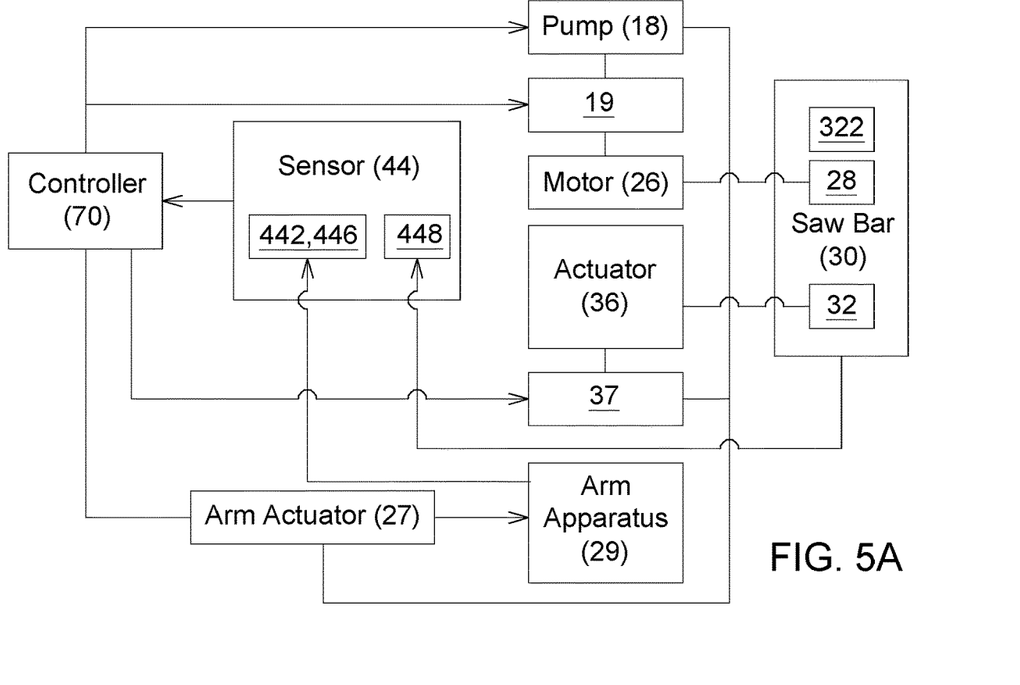
FIG. 5A is a block diagram of the second embodiment showing a tree processing system.
Figure 5B:
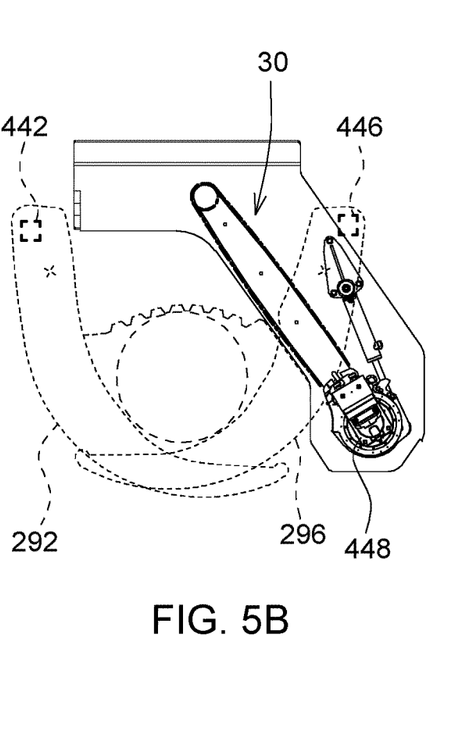
FIG. 5B-5D illustrate a felling head harvesting trees with different girths.
Figure 5C:
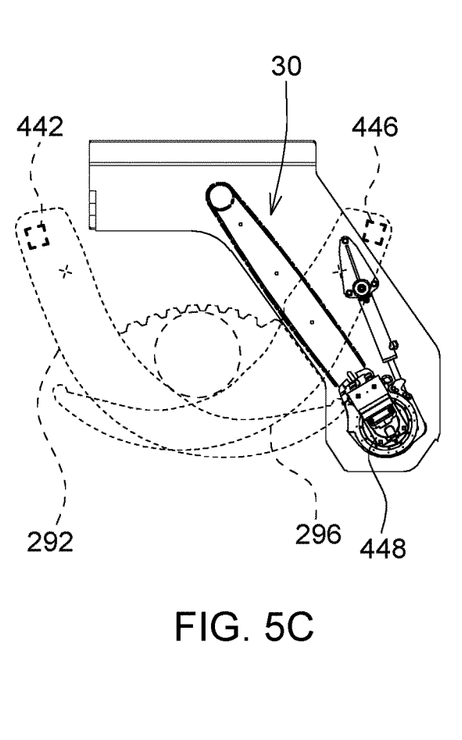
Figure 5D:
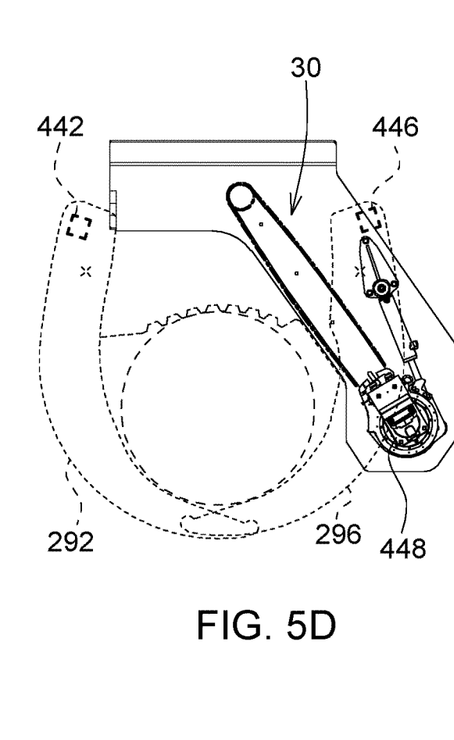

The controller 70 in the second embodiment is configured to calculate a position of the tree and a girth of the tree based on the signals transmitted from the first arm position sensor 442 and the third arm position sensor 446 of position sensors 44. As shown in FIGS. 5B-5D, the pivot angle of the first arm 292 and pivot angle of the third arm 296 (or extension of the arm actuators 27) are changed with different girths of the trees. The saw bar 30 is movable on a plane, and the tree includes a cross-sectional boundary on the plane. The cross-section boundary is calculated by the controller 70 based on the position of the tree and the girth of the tree. In this embodiment, the controller 70 determines that the first position is reached when the saw bar 30 and the cross-sectional boundary start an overlap on the plane. When the first position is reached, the controller 70 transmits the loading signal to the tree processing head 22. Similarly, the controller 70 determines that the second position is reached when the saw bar 30 has moved through the cross-sectional boundary. When the second position is reached, the controller 70 transmits a resting signal to the tree processing head 22 to perform the resting operation. In one implementation, resting operations may include decreasing the hydraulic power flowing into the motor 26 and/or the actuator 36, when it is a hydraulic system, as shown in FIG. 5A. The resting operations may also include returning the saw bar to the home position. In another implementation, resting operations may include decreasing the electrical power flowing into the motor 26 and/or the actuator 36, when it is an electrical system (not shown).

Figure 5E:
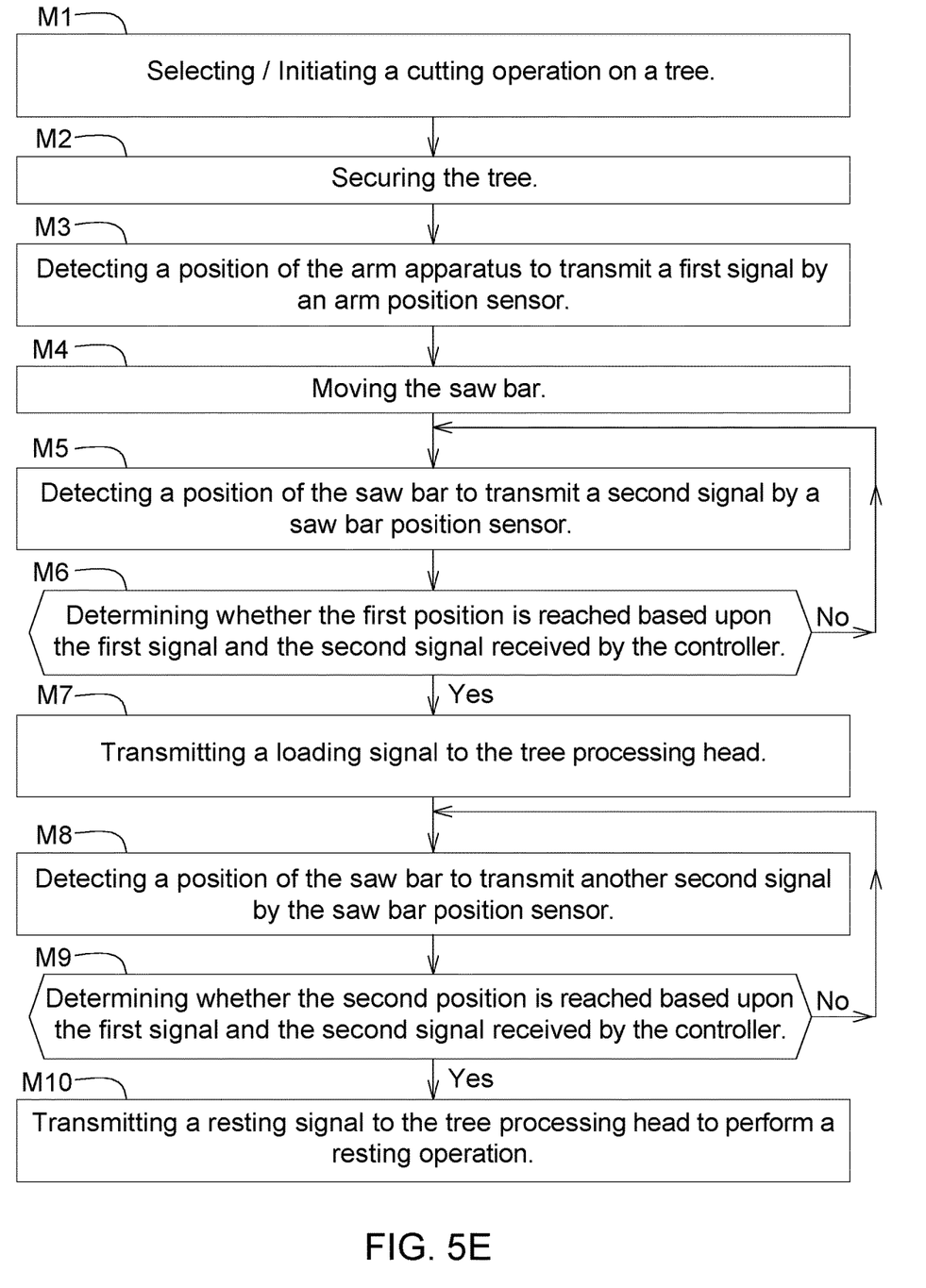
FIG. 5E is a flow chart illustrating a method for the tree processing head in the second embodiment to harvest a tree.

FIG. 5E is a flow chart illustrating a method for the tree processing head in the second embodiment to harvest a tree.

M1: initiating/selecting a cutting operation on a tree, the cutting operation including powering a cutting chain of a saw bar driven by a motor. The operator makes this selection through the operator control member.

M2: securing the tree by the arm apparatus pivotally coupled to a header frame of the tree processing head. It is noted that M2 can be performed prior to M1 in another embodiment.

M3: detecting a position of the arm apparatus to transmit a first signal by an arm position sensor. Optionally, calculating a position of the tree and a girth of the tree based on the first signal by the controller. Further, calculating a cross-sectional boundary of the tree on a plane based on the position of the tree and the girth of the tree.

M4: moving the saw bar by an actuator. The saw bar is configured to be moved from a home position to a first position and to a second position. A cutting zone is defined by a zone between the first position and the second position. The saw bar is moveable on the plane.

M5: detecting a position of the saw bar to transmit a second signal by a saw bar position sensor.

M6: determining whether the first position is reached based upon the first signal and the second signal received by the controller. If yes, go to M7. If no, go to M5. It is noted that, in this embodiment, the step may include determining whether the first position is reached by the controller when the saw bar and the cross-sectional boundary start an overlap on the plane.

M7: transmitting a loading signal to the tree processing head to increase the power flowing into the motor. The power can be hydraulic power or electrical power, depending on the type of the motor.

M8: detecting a position of the saw bar to transmit another second signal by the saw bar position sensor.

M9: determining whether the second position is reached based upon the first signal and the second signal received by the controller. If yes, go to M10. If no, go to M8. It is noted that, in this embodiment, the step may include determining the second position reached by the controller when the saw bar has moved through the cross-sectional boundary (or the saw bar and the cross-sectional boundary terminate the overlap on the plane).

M10: transmitting a resting signal to the tree processing head to perform a resting operation. The resting operation includes returning the saw bar to the home position and/or slowing a speed of the motor (or decreasing the power flowing into the motor).

Without in any way limiting the scope, interpretation, or application of the claims appearing below, a technical effect of one or more of the example embodiments disclosed herein is improve productivity by shortening the cutting cycle. Another technical effect of one or more of the example embodiments disclosed herein is to eliminate dry run cycles in saw so as to save energy. Another technical effect of one or more of the example embodiments disclosed herein is to improve the saw bar cutting operation and even if the operator cannot see the saw bar cutting the tree due to the blind spot.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for a tree processing head to harvest a tree, comprising:
    initiating a cutting operation on a tree, the cutting operation including powering a cutting chain of a saw bar driven by a motor;
    securing the tree;
    moving the saw bar via an actuator, the saw bar configured to be moved from a home position to a first position and to a second position, and the first position and the second position defining a cutting zone;
    detecting a hydraulic pressure of at least one of the motor and the actuator by a sensor;
    determining whether the second position is reached based upon a decrease of the hydraulic pressure by a controller; and
    transmitting a resting signal to the tree processing head to perform a resting operation when the controller determines that the second position is reached.

2. The method of claim 1, wherein the resting operation includes returning the saw bar to the home position.

3. The method of claim 1, wherein the resting operation includes slowing a speed of the motor.

4. The method of claim 1, further comprising comparing hydraulic pressure with a second pressure threshold to determine the second position being reached when the cutting operation is performed, and the hydraulic pressure decreases to or below the second pressure threshold.

5. The method of claim 4, wherein the hydraulic pressure, in response to the removal of resistance from the tree, decreases from a loading pressure to a reference pressure.

6. The method of claim 5, wherein the second pressure threshold is between the loading pressure and the reference pressure.

7. The method of claim 6, wherein the second pressure threshold is defined at a valley of a wave of the loading pressure or a percentage of the loading pressure.

8. The method of claim 4, wherein a data of the second pressure threshold is pre-stored in a memory coupled to or included by the controller.

9. The method of claim 1, further comprising determining whether the first position is reached based upon an increase of the hydraulic pressure detected by the sensor.

10. The method of claim 9, wherein the hydraulic pressure, in response to the resistance from the tree, increases from a reference pressure to a loading pressure.

11. The method of claim 10, wherein the first pressure threshold is between the loading pressure and the reference pressure.

12. The method of claim 10, wherein the first pressure threshold is defined at the peak of a wave of the reference pressure.

13. The method of claim 1, wherein the controller is configured to receive a data of a second pressure threshold.

14. The method of claim 1, wherein moving the saw bar includes pivoting the saw bar about an axis from the home position to the first position and to the second position.

* * * * *